United States Patent

Bitzer et al.

Patent Number: 5,425,073
Date of Patent: Jun. 13, 1995

[54] ANALYZER CIRCUIT AN INDUCTIVE POSITION SENSOR

[75] Inventors: Rainer Bitzer, Weil Der Stadt; Bernd Dittmer, Ludwigsburg; Franz Schwarz; Karl-Heinz Haegele, both of Vaihingen; Thomas Wieja, Eningen; Helmut Schneider, Mutlangen, all of Germany

[73] Assignee: Robert Bosch G.m.b.H., Stuttgart, Germany

[21] Appl. No.: 120,577

[22] Filed: Sep. 10, 1993

[30] Foreign Application Priority Data

Nov. 10, 1992 [DE] Germany .......................... 42 37 879.6

[51] Int. Cl.$^6$ ............................................. G01B 7/00
[52] U.S. Cl. ........................................... 377/17; 331/65
[58] Field of Search ............................. 377/17; 331/65

[56] References Cited

U.S. PATENT DOCUMENTS

| | | | |
|---|---|---|---|
| 4,639,689 | 1/1987 | Bartlett | 331/65 |
| 4,644,570 | 2/1987 | Brosh et al. | 377/17 |
| 5,079,523 | 7/1992 | Kleinhans | 331/65 |

FOREIGN PATENT DOCUMENTS 2053487  4/1981  United Kingdom .

Primary Examiner—John S. Heyman
Attorney, Agent, or Firm—Michael J. Striker

[57] ABSTRACT

The analyzer circuit includes a first oscillator producing an output signal having a first frequency depending on an inductance of an inductive position sensor having two oscillator coils positioned near a movable part; a switching device in the first oscillator for alternatingly connecting one of the two coils and simultaneously disconnecting the other according to a state of the switching device; a frequency divider for converting the output signal at the first frequency to another output signal at another frequency; a counter for counting a pulse signal under control of the other output signal of the frequency divider; a second oscillator connected to the counter and providing input pulses at a fixed frequency to the counter, which counts the input pulses under control of the other output signal of the frequency divider; a start synchronizing circuit for starting and synchronizing the divider and the counter; a flip-flop connected to the frequency divider and to the switching device to switch the state of the switching device; and an arithmetic-logic unit connected to the counter to receive a count from it and having a device for generating a digital output signal characteristic of a position of the movable part relative to the oscillator coils according to the count.

10 Claims, 2 Drawing Sheets

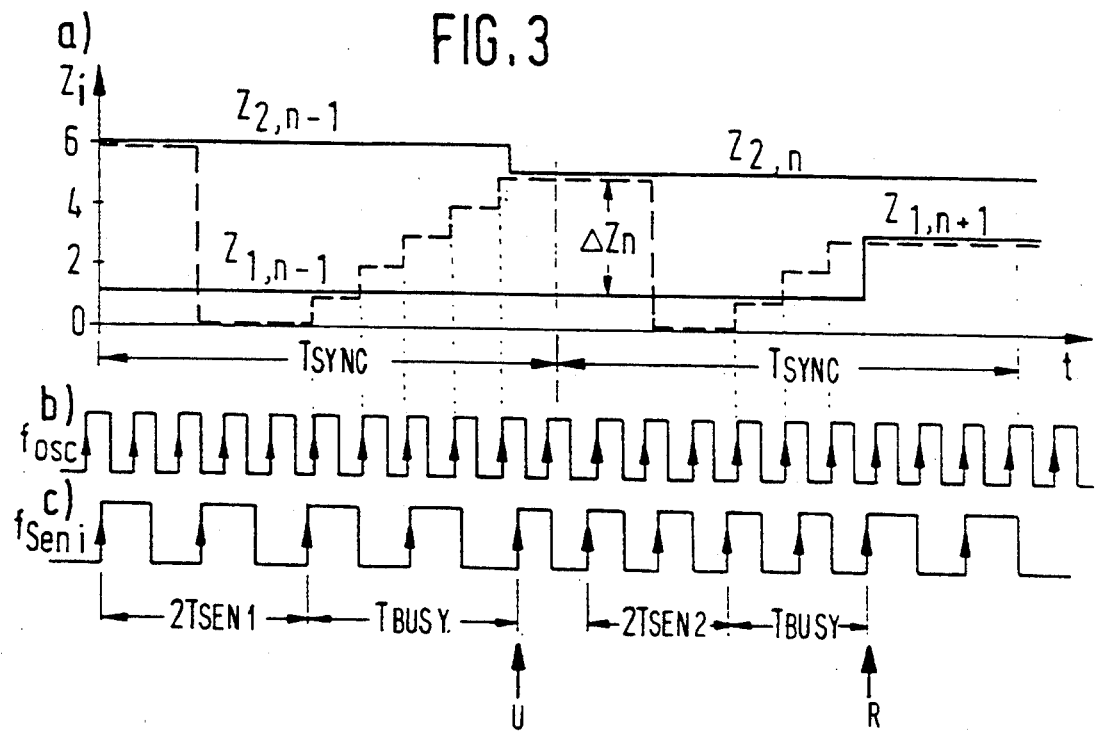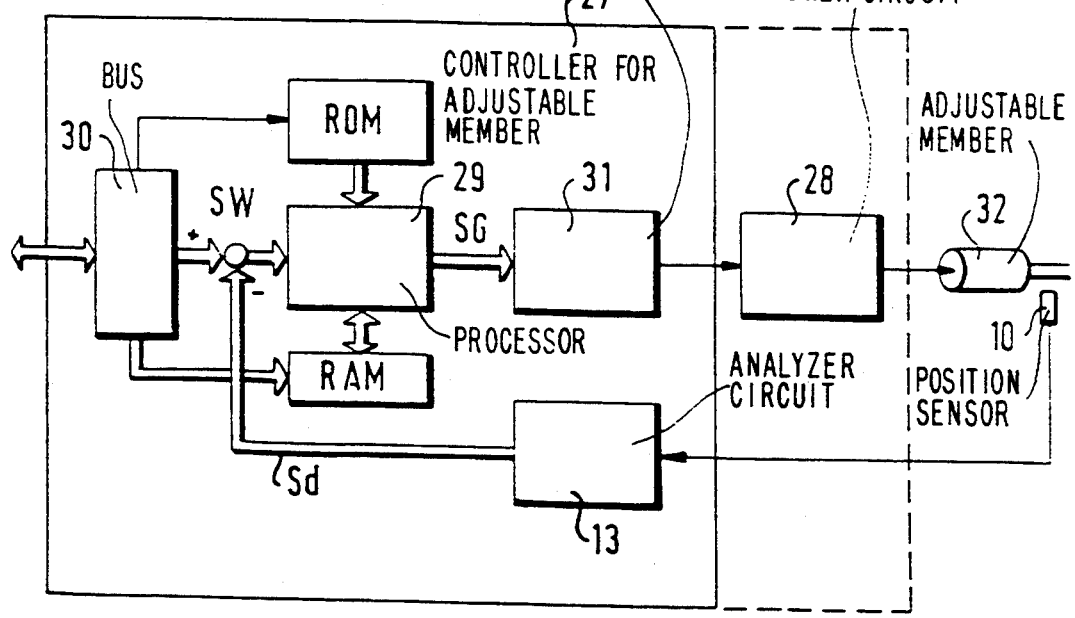

ANALYZER CIRCUIT AN INDUCTIVE POSITION SENSOR

BACKGROUND OF THE INVENTION

The present invention relates to an analyzer circuit for an inductive sensor, particularly for a an inductive position sensor for the position of a moving part based on the eddy current principle.

To determine the position of a part, especially an adjusting element of a control device, an inductive position transmitter has been used, in which a change in the inductance of at least one, advantageously two, coils, depends on the position of the part. The inductance value is then a measure of the position of the part. Usually the analyzer circuit of this type of detector is provided with an oscillator means and an oscillator circuit branch. U.S. Pat. No. 4,644,570 describes an example of this type of inductive position sensor and/or an associated analysis circuit. In this apparatus the position detecting means is a differential sensor, which means, that both inductances change oppositely to each other with the varying position of the moving part. Both coils, which cooperate with a core according to the eddy current principle, are alternately connected to a condenser according to whether it is closer to the one coil or the other, so that in the one position a first circuit branch is connected and in the other position a second circuit branch is connected. Both oscillator circuit branches are driven successively with an oscillator of an oscillator circuit in which the associated eigenfrequencies change according to position because of the position-dependent inductance values. The evaluation of these eigenfrequencies allows a determination of the position of the part.

A disadvantage of the known inductive sensor and/or the associated analysis circuit is that it has a comparatively low sensitivity and furthermore is nonlinear in its response. Furthermore oscillations can occur because of the switching of the oscillator circuit branches, which can lead to erroneous results for the position measurement. An additional advantage is that the output signal is analog or pulse width modulated so that an analog-to-digital converter is required prior to a digital analysis process.

SUMMARY OF THE INVENTION

It is an object of the present invention to provide an analyzer circuit of the above-described type which avoids the above-described disadvantages.

According to the invention, the analyzer circuit for an inductive position sensor, which sensor includes two oscillator coils having inductances varying oppositely to each other according to a position of a movable part relative to the two coils, comprises first oscillator means for producing an output signal having a first frequency ($f_{sens}$) depending on an inductance value of at least one inductance of the two oscillator coils, the first oscillator means including the two oscillator coils of the inductive position sensor and switching means for alternatingly connecting one coil and disconnecting the other according to a state of the switching means so that the oscillator inductance of the first oscillator alternates between the inductance of the first and second oscillator coils; divider means for converting an input signal at one frequency to another at another frequency, the divider means being connected to the first oscillator means to receive the output signal at the first frequency ($f_{sens}$) and to produce another output signal at a second frequency ($f_{sens}/N$); counting means for counting a pulse signal under control of the other output signal received from the divider means and to produce at least one count according to the other output signal; second oscillator means for producing input pulses at a fixed frequency ($f_{osc}$), which are counted by the counting means according to the other output signal of the divider means; a start-synchronizing circuit for the divider means and the counting means; a flip-flop connected to the divider means to receive an input from the divider means and connected to the switching means for controlled switching of the state of the switching means; and an arithmetic-logic unit connected to the counting means to receive the at least one count therefrom and having means for generating a digital output signal characteristic of a position of the movable part relative to the coils according to the at least one count.

The analyzer circuit according to the invention for the inductive sensor has the advantage that its output signal is directly available as a digital signal. This is possible since a part of the analyzer circuit on the output side of the analyzer unit is digital. Since the evaluation of the sensor signal occurs at equidistant time intervals, the prerequisites for a purely digital processing exist.

Various embodiments of the analyzer circuit are possible.

In one embodiment advantageously the sensor oscillator or first oscillator means comprises a switchable LC-parallel oscillator circuit with a high ohmic excitation so that the analyzer circuit is integratable in C-MOS technology. Thus the first oscillator means is advantageously a digital Colpitts oscillator.

A particularly advantageous doubling of the signal resolution relative to that of the known process can be obtained when the count in the counting means is determined alternately for one inductance or the other inductance per analysis time interval and the second counting state is stored temporarily and then the difference between the counts is formed by subtraction of the counts from the one and the other coil in the arithmetic-logic unit.

The transient behavior of the sensor oscillator or first oscillator means is fixed to two oscillation periods. The counting of the N-periods of the sensor oscillation occurs by an automatically blocking frequency divider so that an advantageous synchronization of the signal analysis is possible.

An overflow detection circuit for error indication allows detection of an error when the synchronization time scale is exceeded during the course of an analysis. A reset circuit is provided allowing resetting the entire analyzer circuit to a definite reset state.

BRIEF DESCRIPTION OF THE DRAWING

The objects, features and advantages of the present invention will now be illustrated in more detail by the following detailed description, reference being made to the accompanying drawing in which:

FIG. 3 is a pulse timing diagram for a frequency divider with N=2; and

FIG. 4 is a block diagram of a controller with which a sensor analyzer circuit and sensor according to the invention advantageously cooperate.

DESCRIPTION OF THE PREFERRED EMBODIMENT

Figure 1:
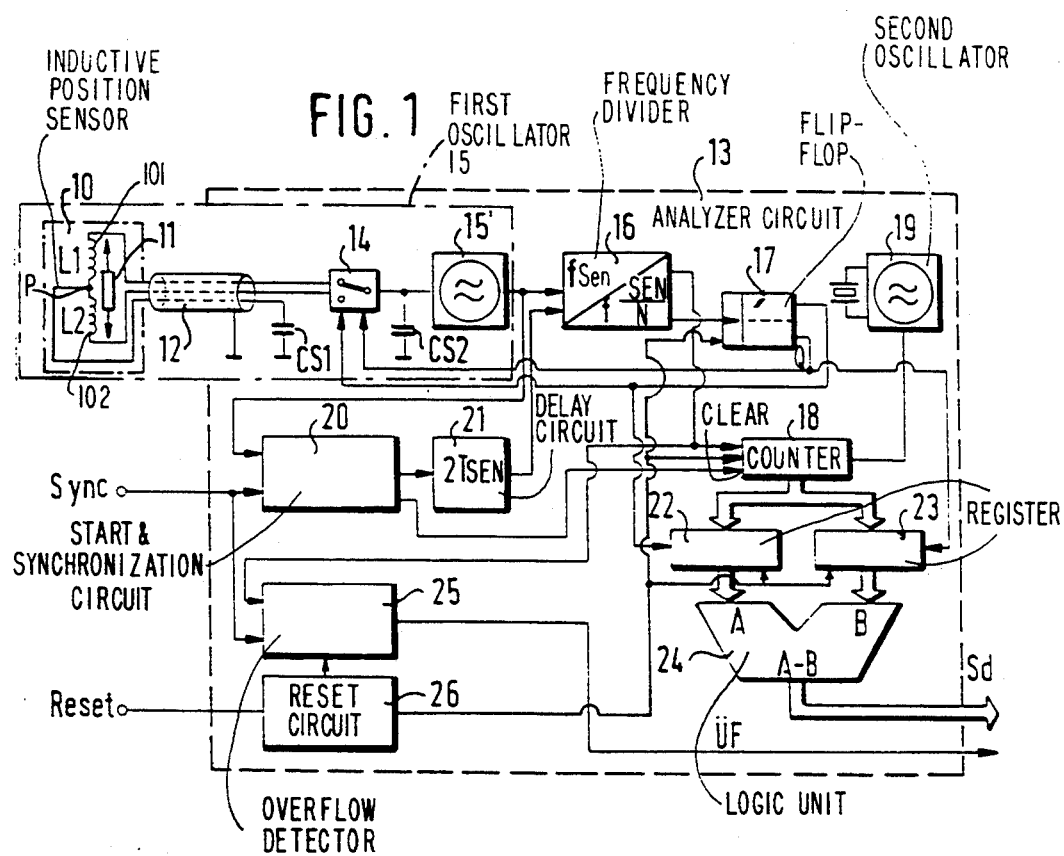
FIG. 1 is a block diagram of an analyzer circuit according to the invention shown connected to an inductive sensor.

A preferred embodiment of the analyzer circuit 13 according to the invention is shown in FIG. 1.

The analyzer circuit 13 includes two oscillator coils 101,102 which are part of an inductive position sensor 10, whose output signal is to be analyzed. This inductive position sensor 10 comprises a core 11 and the two oscillator coils 101,102 having inductances L1 and L2, which change according to the position of the core 11 relative to the coils.

The oscillator coils 101,102 of the inductive position sensor 10 are part of a first oscillator 15 and are connected with remaining components of the first oscillator 15 by a shielded cable 12 containing a plurality of electric conductors as shown in FIG. 1. A common connection point P between the oscillator coils 101,102 is connected via one of the conductors of the shielded cable 12 to ground via the condenser CS1. The opposite ends of the oscillator coils 101,102 are connected by the other conductors of the shielded cable 10 with two inputs of an analog switching circuit 14 illustrated in more detail in FIG. 2, which shows a circuit diagram of first oscillator 15, which is a Colpitts oscillator.

Figure 2:
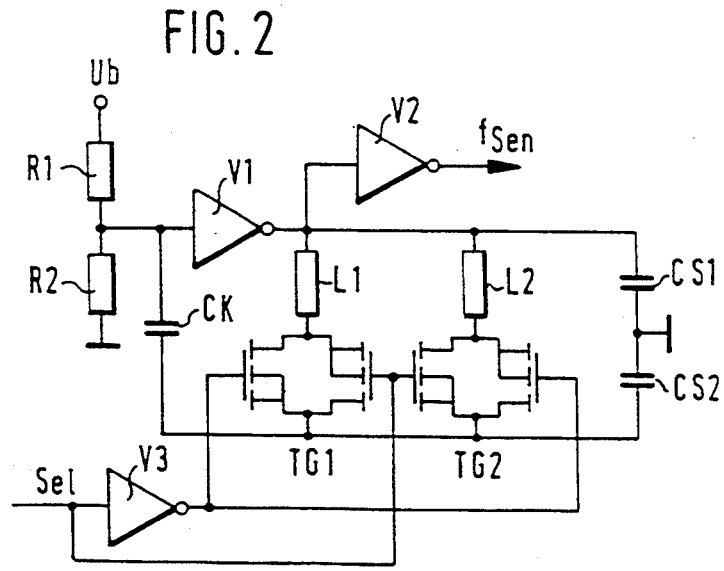
FIG. 2 is a circuit diagram of a digital Colpitts oscillator for excitation of the sensor according to FIG. 1.

The switching circuit 14 of the first oscillator 15 is connected to a frequency divider 16 by other components 15' of the first oscillator 15 as shown in FIG. 2, which divides the transmitted frequency $f_{sen}$ of the first oscillator 15 by N to form the resulting frequency $f_{sen}/N$, wherein N is an arbitrary integer, example N=2. A condenser CS2 is also connected between the output of the analog switching circuit 14 and ground.

The frequency divider 16 has two outputs including a first output connected to a flip-flop 17, e.g. a toggle flip-flop, whose flip-flop outputs Q,Q are connected to the analog switching circuit 14. The second output of the frequency divider 16 is connected to a counter 18, to which signals of a second oscillator 19 are fed. The frequency of the second oscillator 19 is substantially higher than that of the first oscillator 15.

Synchronization signals are fed to the frequency divider 16 via a second input thereof. These synchronization signals are fed to the analyzer apparatus via a terminal Sync and arrive in a circuit for start synchronization 20, to which also the output signals of the first oscillator 15 are fed. The start synchronization circuit 20 is connected via a delay circuit 21 with the frequency divider 16. Another output of the start synchronization circuit 20 is connected to the "Clear" input terminal of the counter 18.

The counter 18 is connected to two registers 22 and 23, which are connected with an arithmetic-logic unit 24, at whose output the digital output-signal $S_d$ is available.

The analyzer circuit 13 has an overflow detection circuit 25, to which the signals from the frequency divider 16 and from the synchronization input Sync are fed and at whose output a signal which indicates overflow may arise. A reset circuit 26 receives corresponding reset signals via a connector Reset.

A digital Colpitts oscillator is shown in FIG. 2. This type of oscillator can advantageously be used as first oscillator 15. It has a particularly good frequency stability in comparison to other known oscillators. If this special stability is not needed, then another type of oscillator can be used for first oscillator 15.

The digital Colpitts oscillator according to FIG. 2, comprises both of the inductive sensor oscillator coils 101,102 having the inductance L1 and L2 and two resistors R1 and R2 connected in series between the battery voltage $U_b$ and ground. The connection point between the two resistors is connected by an amplifier arrangement V1 with one end of each inductive coil L1 and L2. The connection point between the inductive coils L1 and L2 and the amplifier arrangement V1 is also connected to the output of the first oscillator at which the signal $f_{sen}$ is read out via an amplifier V2.

The two condensers CS1 and CS2 are connected in series and the connection point between them is grounded. One end of the branch of the circuit including the condensers CS1 and CS2 connected in series is connected via the amplifier arrangement V1 with the connection point between the resistors R1 and R2 and the other end of that branch is also connected with the same connection point via a condenser CK.

Four field effect transistors cross-connected in the so-called Transmission Gates TG1 and TG2 act as analog switching circuit 14, which is connected between the inductive coils L1 and L2. The transmission gates TG1 and TG2 are connected between the condensers CS2 and CK and are controlled by an amplifier V3, to which the input signal $S_{el}$ is fed.

FIG. 3 shows the timing or pulse diagram for the example of a divisor of N=2 of the frequency divider 16. FIG. 3a shows the counter contents versus time as a dashed line. The register contents are shown in FIG. 3a as a solid line. The oscillator frequency $f_{osc}$ versus time is shown in FIG. 3b. FIG. 3c similarly shows the frequency $f_{sens}$ versus time. The period of the synchronization signal pulse, $T_{Sync}$; the oscillator period of the sensor, $T_{Sen1,2}$; and the doubled period of the signal Busy, $T_{Busy}$, existing for N=2 are shown. The switching point is indicated with U and the register receipt point with R. The significance of this timing diagram will be understood from the following description of the sensor analysis.

The analysis circuit 13 is fed a synchronization signal over the input Sync, which provides synchronization in the analysis of the sensor signal. This signal is a square wave signal, each positive flank of a synchronization pulse activating a new conversion stage. The counting of N periods of the sensor oscillator or first oscillator with the inductive coils L1 and L2 is to be understood as a conversion stage. The common counter 18 is simultaneously reset with the start pulse by the signal "Clear".

After a delay of two sensor periods $T_{sen}$, the programmable frequency divider 16, which has been idle up to this time, is activated by the delay circuit 21, fed the divisor N and is released for counting. The signal "Busy" is converted from logic state "0" to logic state "1" by release of the frequency divider, whereby the cyclic input "ENABLE" of the counter 18 is activated.

The next N-cycles of the sensor-oscillator 15 are now counted by the frequency divider 16. During this time the count in the counter 18 increases with the cycle frequency $f_{osc}$, which is generated in the oscillator 19 and is substantially higher than the frequency of the first oscillator 15, $f_{sen}$. By this selection of frequency as high a resolution of the sensor signal as possible is guaranteed.

If the divider 16 reaches a counter state, which automatically blocks the divider, i.e. leads to a transition to the idle state, the signal "Busy" takes the logic state 0 again and activates the input of the counter 18 because of that, so that the count is retained. Simultaneously the divider 16 signals the toggle flip-flop 17 with a pulse having a jump of 0 to 1 that the conversion stage has ended.

The state of the toggle flip-flop 17 is switched with the rising flank of this pulse. The positive signal flank produced at the outputs Q,Q provides for the transfer of the count to the registers 22 and/or 23.

One of the registers 22 or 23 is charged with the count from the counter 18 according to the state of the toggle flip-flop. The arithmetic-logic unit 24 connected to the registers 22, 23 subtracts their contents from each other. The resulting digital signal $S_d$ is fed as a digital sensor signal e.g. to a digital controller such as the digital controller 27 shown in FIG. 4 as an actual value.

The state of the analog switching circuit 14 changes according to the switching of the toggle flip-flop 17 because of the connection of the control inputs of the analog switching circuit 14 with the flip-flop outputs Q,Q, so that the oscillator inductance of the first oscillator 15 alternates between L1 and L2 in operation.

The remaining time to the next positive flank of the synchronization signal Sync in the sensor oscillator circuit additional to the fixed delay time of $2T_{sen}$, which is produced in the delay circuit 21, is additional build up or transient time.

If the conversion stage of the divider 16 is still not completed prior to occurrence of the next synchronization signal, an overflow error occurs in the evaluation or analysis circuit. This error is detected by the overflow detection circuit 25 by a coupling of the signals SYNC and BUSY, which are both fed to the overflow detection circuit 25.

This overflow error can produce a signal to indicate its occurrence. For its elimination several steps can be taken. For example the frequency of the synchronization signal can be reduced. The capacity of the condensers CS1 and CS2 can be reduced. Also the divisor N can be reduced.

A suitable reset signal is produced by a reset circuit 26 which allows the entire analysis circuit 13 to be reset into a definite initial state. In case of an activation of the reset circuit 26 both registers 22 and 23 and the counter 18 are reset to 0, a overflow error indication generated by the overflow detection circuit 25 is put out and the toggle flip-flop 17 is put into a definite state and the divider 16 is put into a holding state. The connection of the rest circuit 26 to the overflow detection circuit 25, the registers 22 and 23, the counter 18 and the flip-flop 17 is shown in FIG. 1.

The obtainable resolution of the digital sensor output signal can be understood with the help of FIG. 3. The resolution A is defined as the required number of binary positions for dual representation of the magnitude of the sensor output signal $\Delta Z_{max}$ including a bit for indicating the conversion change. The necessary sizes may be derived from the analysis process as follows:

A. Counting of the N-fold period of the sensor oscillator with the inductive coils L1 and L2:

$$Z1 = N * T_{sen,1} * f_{osc} \quad : \text{Count in Register 1} \quad (1)$$

$$Z2 = N * T_{sen,2} * f_{osc} \quad : \text{Count in Register 2} \quad (2)$$

wherein $$T_{sen,i} = 2\pi * \sqrt{(L_i * C)} \quad : \text{period without damping} \quad (3)$$

Also the frequency of the auxiliary oscillator is much larger than the frequency of the oscillator so that $$T_{osc} < < T_{seni} \quad (4)$$

The results are stored in the registers.

B. Formation of the time difference and/or substraction of the register contents:

$$\Delta Z = Z1 - Z2 \quad (5)$$

$$\Delta Z = N * f_{osc} * 2\pi * \sqrt{C} * (\sqrt{L1} - \sqrt{L2}) \quad (6)$$

For small inductance changes due to a position change $\Delta S$ approximately this latter formula (6) becomes:

$$\Delta Z = N * f_{osc} * 2\pi * \sqrt{C} * \sqrt{L1} * \Delta L / 2L_1 \quad (7)$$

The position change $\Delta s$ is thus with good approximation proportional to the inductance change:

$$\Delta s \approx \Delta L/L1 \text{ and } \Delta s \approx \Delta Z \quad (8)$$

For an optimum analysis the following conditions must be fulfilled:

$$T_{syn} > N * T_{sen,i, max} \quad (9)$$

$$T_{Seni, max} = 2\pi \sqrt{CL1} \quad (10)$$

Thus:

$$Z < T_{syn} * f_{osc} * \Delta L / 2L1 \quad (11)$$

From FIG. 3 it is clear that the frequency of the auxiliary oscillator and the period of the synchronization signal $T_{syn}$ n exerts a great influence on the obtainable resolution. By doubling the oscillator frequency or the period of the synchronization signal the resolution A of the arrangement is increased by a bit. The A corresponding to the number of binary positions for $\Delta Z_{max}$ in the dual representation is:

$$A = \text{Log}_2(f_{osc}) + \text{Log}_2(T_{syn}) + \text{Log}_2(\Delta L / 2L1_{max})$$

$$A \approx \text{Log}_2(f_{osc}) \quad (12)$$

For operation of the analysis circuit 13 the oscillator circuit capacitance C and/or the capacitance CS1, CS2 in the digital Colpitts oscillator, the divider frequency N and the frequency of the auxiliary oscillator must be suitably set. As a starting point the eddy current inductance can be set at 12 to 18 microhenrys, the period of the synchronization signal at 100 microseconds and the resolution to be achieved for the digital sensor output signal at 9 or 10 bits.

Additional requirements to be fulfilled include a possible good selection of the period of the synchronization signal relative to duration of the conversion stage and a sufficiently large difference between the oscillator capacity and the parasitic conductor capacity CP of 100 to 200 pF/m.

If the sensor shown in FIG. 1 together with the associated analyner circuit 13 is used with a controller as for example disclosed in German Patent Application P 41 17 815.7, the digital output signal $S_d$ can be used directly as the actual value for the regulation, if the sensor itself is used as an actual value transmitter or generator. In FIG. 4 the entire arrangement is shown, in which the controller 27 comprises a processor 29, a Bus device 30, a RAM for storage of variables, a ROM for the controlling program and a final stage circuit 31. which is fed the position value SG from the processor 29. Its structure and its function are described in the above-mentioned German Patent Application.

The controller 27 with the associated semiconductor power circuit 28 is integrated in a single chip. This integrated controller controls the position of the adjustable member 32, whose position is determined with the sensor 10. The digital output signal of the analyzer circuit 13 according to the invention is fed directly to this controller 27 without the analog-digital converter that has been previously required.

A standard bus section 30 for the microcomputer can also be used to make electrical connection between the oscillator coils 101,102 of the inductive position sensor 10 and the other components of the first oscillator 15.

The analyzer circuit 13 is integrable on a chip, e.g. in C-MOS technology.

In other embodiments a reduction in the hardware cost can be obtained when the arithmetic-logic unit 24 is part of the processor.

While the invention has been illustrated and embodied in an analyzer circuit for an inductive position sensor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. Analyzer circuit for an inductive position sensor including two oscillator coils having inductances varying oppositely to each other according to a position of a movable part relative to the two oscillator coils, said analyzer circuit comprising first oscillator means for producing an output signal having a first frequency ($f_{sens}$) depending on an inductance value of at least one of said inductances of the two oscillator coils, the first oscillator means including the two oscillator coils of the inductive position sensor and switching means for alternatingly connecting one of said two oscillator coils and disconnecting another of said two oscillator coils according to a state of said switching means so that the oscillator inductance of the first oscillator alternates between the inductance of the first and second oscillator coils;

divider means for converting an input signal at one frequency to another signal at another frequency, said divider means being connected to said first oscillator means to receive said output signal at said first frequency ($f_{sens}$) as said input signal and to produce another output signal at a second frequency ($f_{sens}/N$);

counting means for counting a pulse signal connected to said divider means to receive said other output signal from said divider means and to produce at least one count according to said other output signal;

second oscillator means for producing a plurality of input pulses at a fixed frequency ($f_{osc}$), said second oscillator means being connected to said counting means so that said input pulses are counted by said counting means according to said other output signal;

means for starting and synchronizing said divider means and said counting means;

a flip-flop connected to said divider means to receive an input from said divider means and connected to said switching means for controlled switching of said state of said switching means; and an arithmetic-logic unit connected to said counting means to receive said at least one count therefrom and having means for generating a digital output signal characteristic of a position of said movable part relative to said oscillator coils according to said at least one count.

2. Analyzer circuit as defined in claim 1, wherein said divider means comprises an automatically blocking frequency divider having a divisor N.

3. Analyzer circuit as defined in claim 2, wherein said divisor N is an integer.

4. Analyzer circuit as defined in claim 1, wherein said flip-flop is a toggle flip-flop with outputs (Q,Q), said outputs of said toggle flip-flop are connected with said switching means and said switching means switches according to a state of said outputs (Q,Q) of said toggle flip-flop.

5. Analyzer circuit as defined in claim 1, further comprising delay circuit means connected between said synchronization means and said divider means to delay receipt of said synchronization signal by said counting means.

6. Analyzer circuit as defined in claim 5, further comprising an overflow detection circuit for indicating an overflow error.

7. Analyzer circuit as defined in claim 1, further comprising reset means for resetting said analyzer circuit to a definite initial state.

8. Analyzer circuit as defined in claim 1, wherein said first oscillator means comprising a digital Colpitts oscillator.

9. Analyzer circuit as defined in claim 8, wherein said first oscillator means produces a frequency less than a frequency of said second oscillator means.

10. Analyzer circuit as defined in claim 1, further comprising a C-MOS technology chip in which said analyzer circuit is integrated.

* * * * *